(12) United States Patent
Sumita et al.

(10) Patent No.: US 10,311,147 B2
(45) Date of Patent: Jun. 4, 2019

(54) MACHINE TRANSLATION APPARATUS AND MACHINE TRANSLATION METHOD

(71) Applicant: KABUSHIKI KAISHA TOSHIBA, Minato-ku, Tokyo (JP)

(72) Inventors: Kazuo Sumita, Yokohama Kanagawa (JP); Satoshi Sonoo, Chigasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/433,423

(22) Filed: Feb. 15, 2017

(65) Prior Publication Data
US 2017/0262434 A1    Sep. 14, 2017

(30) Foreign Application Priority Data
Mar. 14, 2016  (JP) .................................. 2016-049986

(51) Int. Cl.
*G06F 17/20*    (2006.01)
*G10L 15/22*    (2006.01)
*G06F 17/28*    (2006.01)
*G06F 16/242*   (2019.01)
*G06F 16/2455*  (2019.01)
*G10L 15/26*    (2006.01)
(Continued)

(52) U.S. Cl.
CPC .......... *G06F 17/289* (2013.01); *G06F 16/243* (2019.01); *G06F 16/2455* (2019.01); *G06F 16/29* (2019.01); *G06F 16/90332* (2019.01); *G10L 15/26* (2013.01)

(58) Field of Classification Search
CPC ........ G06F 17/20; G06F 17/21; G06F 17/289; G06F 17/30401; G06F 17/30477; G10L 15/26
USPC ....... 704/2, 4, 7, 8, 9, 251, 257, 270, 270.1, 704/275
See application file for complete search history.

(56) References Cited

U.S. PATENT DOCUMENTS 6,061,646 A    5/2000  Martino et al.
7,197,460 B1   3/2007  Gupta et al.
(Continued)

FOREIGN PATENT DOCUMENTS

JP    2000-090087 A    3/2000
JP    2002132661       5/2002
(Continued)

*Primary Examiner* — Richemond Dorvil
*Assistant Examiner* — Rodrigo A Chavez
(74) *Attorney, Agent, or Firm* — Knobbe, Martens, Olson & Bear LLP

(57) ABSTRACT

According to one embodiment, a machine translation apparatus includes the following elements. The machine translation unit performs machine translation on a first text in a first language to generate a first machine translation result in a second language. The retrieval unit retrieves a first question sentence in the first language similar to the first text to obtain a degree of similarity between the first text and the first question sentence. The determination unit determines a first answer sentence in the first language corresponding to the first question sentence to be an output target when the degree of similarity is higher than a threshold and determines the first machine translation result to be an output target when the degree of similarity is lower than the threshold.

12 Claims, 11 Drawing Sheets

(51) Int. Cl.
*G06F 16/9032* (2019.01)
*G06F 16/29* (2019.01)

(56) References Cited

U.S. PATENT DOCUMENTS

| | | | |
|---|---|---|---|
| 7,869,998 B1* | 1/2011 | Di Fabbrizio | G10L 13/00 |
| | | | 704/1 |
| 8,051,061 B2* | 11/2011 | Niu | G06F 16/3338 |
| | | | 707/706 |
| 8,983,977 B2* | 3/2015 | Ishikawa | G06F 16/3329 |
| | | | 707/750 |
| 2004/0218751 A1* | 11/2004 | Colson | H04M 3/51 |
| | | | 379/265.09 |
| 2008/0104615 A1 | 5/2008 | Nolan et al. | |
| 2008/0288474 A1 | 11/2008 | Chin et al. | |
| 2010/0010803 A1* | 1/2010 | Ishikawa | G06F 17/2795 |
| | | | 704/9 |
| 2010/0217592 A1* | 8/2010 | Gupta | G06F 17/279 |
| | | | 704/236 |
| 2011/0072034 A1* | 3/2011 | Sly | G01C 21/32 |
| | | | 707/769 |
| 2012/0221323 A1 | 8/2012 | Sumita et al. | |
| 2013/0304730 A1* | 11/2013 | Zhou | G06Q 30/02 |
| | | | 707/723 |
| 2014/0067363 A1* | 3/2014 | Ogren | G06F 17/28 |
| | | | 704/2 |
| 2016/0012034 A1* | 1/2016 | Andrade Silva | G06F 17/2785 |
| | | | 704/9 |
| 2016/0162478 A1* | 6/2016 | Blassin | G06Q 10/06311 |
| | | | 706/12 |
| 2017/0103069 A1* | 4/2017 | Brennan | G06F 16/24522 |

FOREIGN PATENT DOCUMENTS

| | | |
|---|---|---|
| JP | 2003-030187 A | 1/2003 |
| JP | 2004-355226 A | 12/2004 |
| JP | 2005-004716 A | 1/2005 |
| JP | 2008-234427 A | 10/2008 |
| JP | 2010-508610 A | 3/2010 |
| JP | 2010061308 | 3/2010 |
| WO | WO2008120360 | 10/2008 |
| WO | WO 2008/144538 A1 | 11/2008 |
| WO | WO 2011/036769 A1 | 3/2011 |

* cited by examiner

| Question sentence (Japanese) | Question sentence (English) | Answer sentence (Japanese) | Answer sentence (English) |
|---|---|---|---|
| コンビニはこの辺にありますか? | Is there a convenience store near here? | ここから東に100メートルです。 | It is 100m east from here. |
| トイレはどこですか? | Where is a restroom? | あの角を曲がったあたりにあります。 | It is around that corner. |
| ... | ... | ... | ... |

F I G. 6

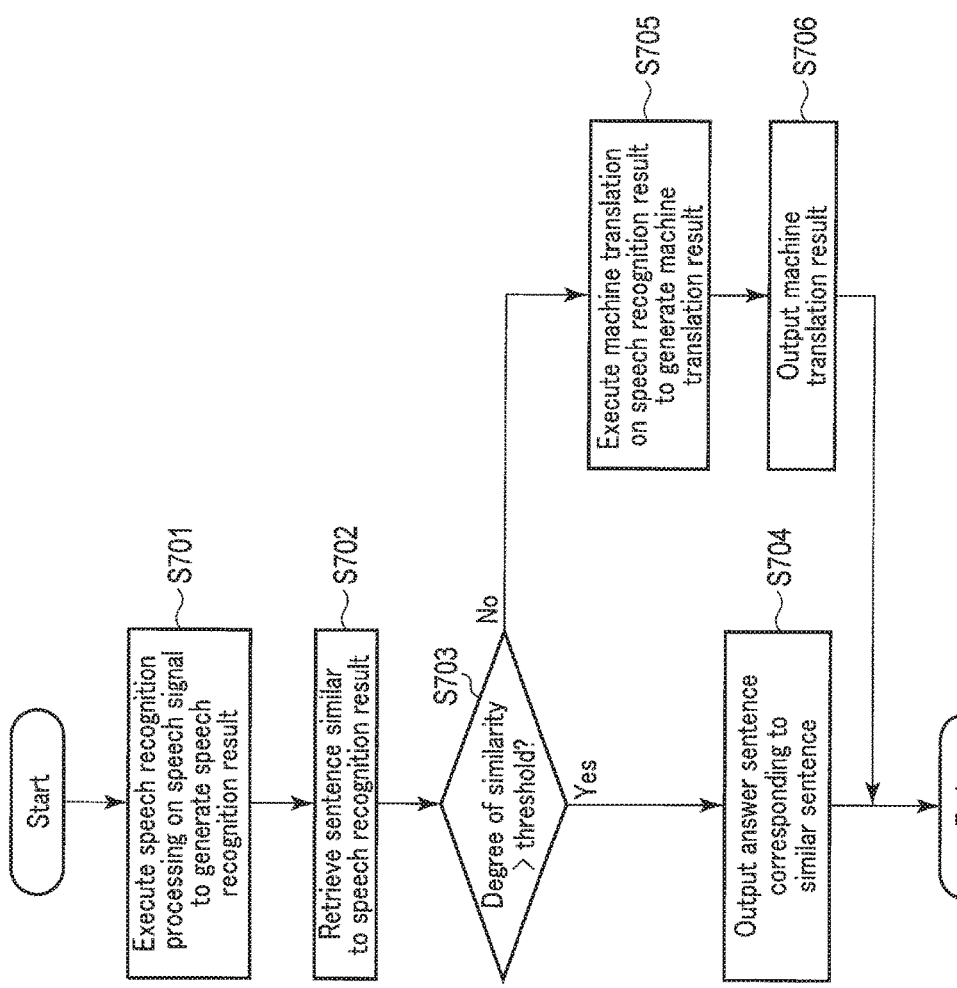
F I G. 7

| Question sentence (Japanese) 1201 | Question sentence (English) 1202 | Answer sentence (Japanese) 1203 | Answer sentence (English) 1204 | Location information 1205 |
|---|---|---|---|---|
| コンビニはこの辺にありますか? | Is there a convenience store near here? | ここから東に100メートルです。 | It is 100m east from here. | Counter 1 |
| トイレはどこですか? | Where is a restroom? | あの角を曲がったあたりにあります。 | It is around that corner. | Counter 1 |
| ... | ... | ... | ... | ... |
| コンビニはこの辺にありますか? | Is there a convenience store near here? | 駅前にあります。 | It is in front of the station. | Counter 2 |
| 動物園の閉園時間は何時ですか? | When does the zoo close? | 午後6時です。 | It's six o' clock, PM. | Counter 2 |
| ... | ... | ... | ... | ... |

F I G. 12

| Question sentence (Japanese) 1201 | Question sentence (English) 1202 | Answer sentence (Japanese) 1203 | Answer sentence (English) 1204 | Location information 1205 |
|---|---|---|---|---|
| コンビニはこの辺にありますか？ | Is there a convenience store near here? | ここから東に100メートルです。 | It is 100m east from here. | Counter 1 |
| トイレはどこですか？ | Where is a restroom? | あの角を曲がったあたりにあります。 | It is around that corner. | Counter 1 |
| ... | ... | ... | ... | ... |
| コンビニはこの辺にありますか？ | Is there a convenience store near here? | 駅前にあります。 | It is in front of the station. | Counter 2 |
| 動物園の閉園時間は何時ですか？ | When does the zoo close? | 午後6時です。 | It's six o'clock, PM. | Counter 2 |
| (TEMP) トイレはどこですか？ 1401 | (TEMP) Where is a restroom? 1402 | (TEMP) あの角を曲がったあたりにあります。 1403 | (TEMP) It is around that corner. 1404 | Counter 2 1405 |
| ... | ... | ... | ... | ... |

F I G. 14

MACHINE TRANSLATION APPARATUS AND MACHINE TRANSLATION METHOD

CROSS-REFERENCE TO RELATED APPLICATIONS

This application is based upon and claims the benefit of priority from Japanese Patent Application No. 2016-049986, filed Mar. 14, 2016, the entire contents of which are incorporated herein by reference.

FIELD

Embodiments described herein relate generally to a machine translation apparatus and a machine translation method.

BACKGROUND

With the increasing economic and cultural globalization, expectations have been raised for speech translation systems which support communication between people having different mother tongues. Such a speech translation system receives a speech in one language given by a first user to translate the speech into data in another language by speech recognition processing and machine translation processing. The speech translation system then presents a result of the translation to a second user in the form of a text or a speech. The speech translation system is utilized as, for example, an interpretation apparatus at an information counter.

In connection with the above-described speech translation system, translation apparatus is known which stores a second user's response (speech) to a first user's speech in association with the first user's speech and which predicts and presents the next speeches. By predicting and presenting the next speeches and allowing the user to select from the speeches, the translation apparatus reduces burdens on the user resulting from dialogs in different languages. To further reduce the burdens on the user, a translation apparatus has been desired which automatically answers the user's questions.

BRIEF DESCRIPTION OF THE DRAWINGS

FIG. 6 is a diagram illustrating data stored in a storage of the machine translation apparatus in FIG. 2;

FIG. 7 is a flowchart illustrating a first operation of the machine translation apparatus in FIG. 2;

FIG. 12 is a diagram illustrating data stored in a storage of a machine translation apparatus according to a fourth embodiment;

FIG. 14 is a diagram illustrating data stored in the storage of the machine translation apparatus according to the fourth embodiment.

DETAILED DESCRIPTION

Figure 1:
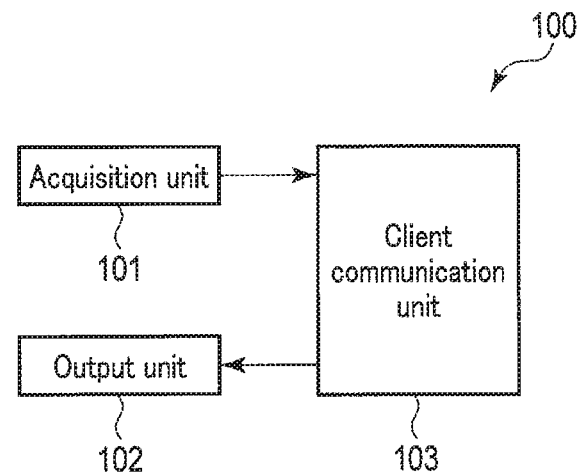
FIG. 1 is a block diagram illustrating a client according to a first embodiment.

According to one embodiment, a machine translation apparatus includes a machine translation unit, a retrieval unit, and a determination unit. The machine translation unit performs machine translation on a first text in a first language to generate a first machine translation result in a second language. The retrieval unit retrieves a first question sentence in the first language similar to the first text to obtain a degree of similarity between the first text and the first question sentence. The determination unit determines a first answer sentence in the first language corresponding to the first question sentence to be an output target when the degree of similarity is higher than a threshold and determines the first machine translation result to be an output target when the degree of similarity is equal to or lower than the threshold.

Hereinafter, embodiments will be described with reference to the drawings. In the embodiments described below, like reference numerals will be used to denote like elements, and redundant descriptions will be omitted where appropriate.

In the embodiments described below, a language used by a questioner (first speaker) is English, and a language used by a questionee (second speaker) is Japanese. The languages used by the questioner and the questionee are not limited to English and Japanese, and a combination of other languages may be used. Three or more speakers may be present and may use different languages.

First Embodiment

Figure 2:
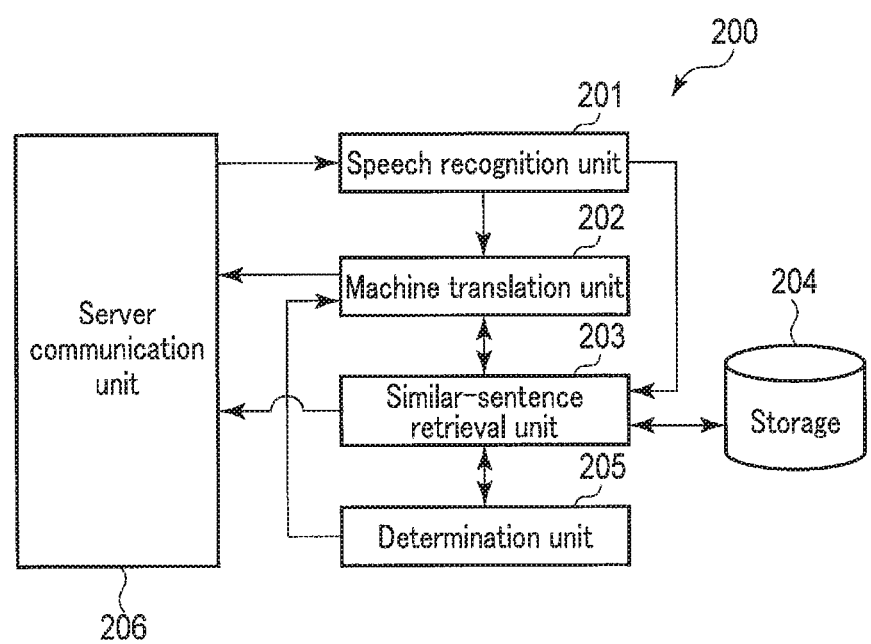
FIG. 2 is a block diagram illustrating a machine translation apparatus according to the first embodiment.

FIG. 1 illustrates a client 100 according to the first embodiment, and FIG. 2 illustrates a machine translation apparatus 200 according to the first embodiment. The client 100 includes an acquisition unit 101, an output unit 102, and a client communication unit 103. The machine translation apparatus 200 includes a speech recognition unit 201, a machine translation unit 202, a similar-sentence retrieval unit 203, a storage 204, a determination unit 205, and a server communication unit 206.

The client 100 exchanges data with the machine translation apparatus 200 via the client communication unit 103. The machine translation apparatus 200 exchanges data with the client 100 via the server communication unit 206. The client communication unit 103 and the server communication unit 206 exchange data with each other. For the exchange of data between the client 100 and the machine translation apparatus 200, the descriptions "via the client communication unit 103" and "via the server communication unit 206" are hereinafter omitted.

The client 100 can optionally switch a language used. The machine translation apparatus 200 is notified, by the client 100, of the language used and can thus appropriately process data received from the client 100.

The acquisition unit 101 acquires a speech signal (data on a speech) given by a speaker. As the acquisition unit 101, a speech input device, for example, a microphone, may be used. The acquisition unit 101 outputs the speech signal to the speech recognition unit 201. The acquisition 101 is not limited to speech inputs and may use text inputs provided using a keyboard or the like.

The output unit 102 may receive a machine translation result from the machine translation unit 202. The output unit 102 may receive an answer sentence from the similar-sentence retrieval unit 203. The output unit 102 displays a text from the machine translation result or a text from the answer sentence using a display device, for example, a display. The output unit 102 is not limited to the display device, and may output the text from the machine translation result or text from the answer sentence by voice using a speech output device such as a speaker.

The speech recognition unit 201 receives the speech signal from the acquisition unit 101. The speech recognition unit 201 performs speech recognition on the speech signal (corresponding to a "first speech signal" in a first language or a "second speech signal" in a second language) to generate a speech recognition result in a text format (corresponding to a "first text" or a "second text"). The speech recognition unit 201 may output the speech recognition result to the machine translation unit 202. The speech recognition unit 201 may output the speech recognition result to the similar-sentence retrieval unit 203. When, instead of the speech signal, a text is received from the acquisition unit 101, the speech recognition processing in the speech recognition unit 201 is omitted.

The machine translation unit 202 may receive the speech recognition result the speech recognition unit 201. The machine translation unit 202 may receive the answer sentence from the similar-sentence retrieval unit 203. The machine translation unit 202 performs machine translation on the speech recognition result or the answer sentence to generate a machine translation result. The machine translation unit 202 may output the machine translation result to the output unit 102. The machine translation unit 202 may output the machine translation result on the speech recognition result to the similar-sentence retrieval unit 203. The machine translation unit. 202 may have outputs therefrom controlled by the similar-sentence retrieval unit 203 or the determination unit 205.

The similar-sentence retrieval unit 203 may receive the speech recognition result from the speech recognition unit 201. The similar-sentence retrieval unit 203 may receive the machine translation result from the machine translation unit 202. The similar-sentence retrieval unit 203 retrieves a question sentence similar to the speech recognition result or a question sentence similar to the machine translation result from the storage 204 to obtain the degree of similarity between the speech recognition result and the question sentence or between the machine translation result and the question sentence. The degree of similarity is calculated based on, for example, the number of words commonly included in both character strings. The similar-sentence retrieval unit 203 outputs the degree of similarity to the determination unit 205.

The similar-sentence retrieval unit 203 may acquire an answer sentence corresponding to the question sentence from the storage 204. The similar-sentence retrieval unit 203 outputs the answer sentence to the output unit 102 or the machine translation unit 202. The similar-sentence retrieval unit 203 may have outputs therefrom controlled by the determination unit 205.

The storage 204 stores at least a plurality of question sentences in a first language and a plurality of answer sentences in the first language corresponding to the respective question sentences in the first language. Alternatively, the storage 204 stores a plurality of question sentences in the first language, a plurality of answer sentences in the first language corresponding to the respective question sentences in the first language, a plurality of question sentences in a second language, and a plurality of answer sentences in the second language corresponding to the respective question sentences in the second language in association with each other.

The determination unit 205 receives the degree of similarity from the similar-sentence retrieval unit 203. The determination unit 205 determines whether or not the degree of similarity is higher than a threshold. When the degree of similarity is higher than the threshold, the determination unit 205 determines the answer sentence corresponding to the question sentence or a translated sentence for the answer sentence to be an output target and performs output control on the similar-sentence retrieval unit 203. When the degree of similarity is equal to or lower than the threshold, the determination unit. 205 determines the machine translation result to be an output target and performs output control on the machine translation unit 202.

Figure 3:
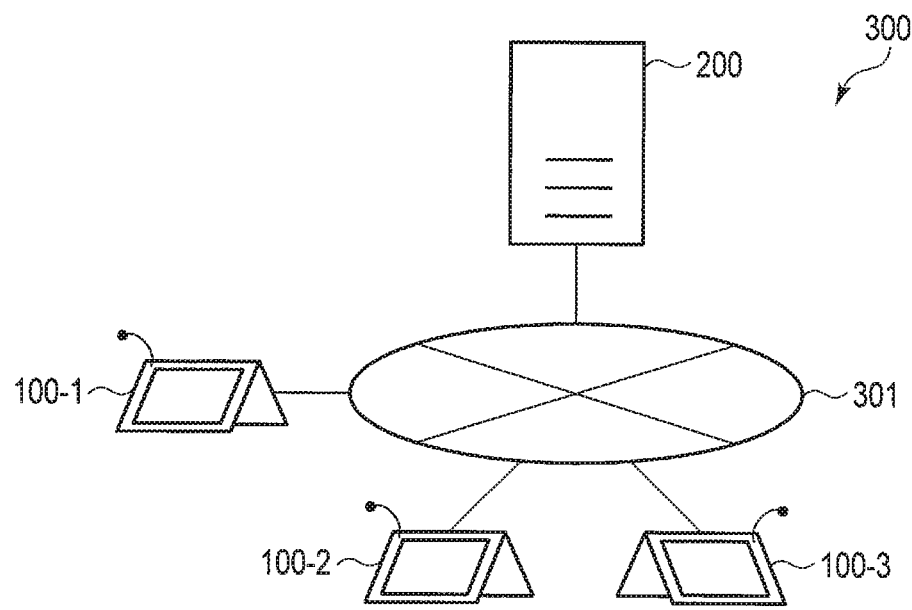
FIG. 3 is a diagram illustrating a configuration of a machine translation system.

FIG. 3 illustrates a configuration of a machine translation system 300. In the machine translation system 300, a client 100-1, a client 100-2, a client 100-3, and the machine translation apparatus 200 are connected together via a network 301. The machine translation system 300 may be at least partly configured using wireless connections.

Figure 4:
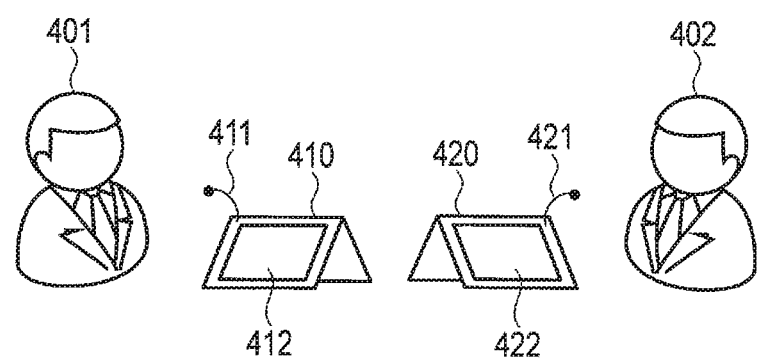
FIG. 4 is a diagram depicting a usage example of the machine translation system in FIG. 3.

FIG. 4 depicts a usage example of the machine translation system 300. In FIG. 4, a first speaker 401 and a second speaker 402 have dialogs using a first client 410 and a second client 420, respectively. The first client 410 is set to the first language, and the second client 420 is set to the second language. The first client 410 includes a microphone 411 corresponding to the acquisition unit and a display 412 corresponding to the output unit. The second client 420 similarly includes a microphone 421 corresponding to the acquisition unit and a display 422 corresponding to the output unit. In FIG. 4, the client communication unit and the machine translation apparatus 200 are omitted. The first client 410 and the second client 420 may be implemented in one device. In that case, two sets each of a microphone and a display are provided. The client used by the first speaker is set to the first language. The client used by the second speaker is set to the second language.

Figure 5:
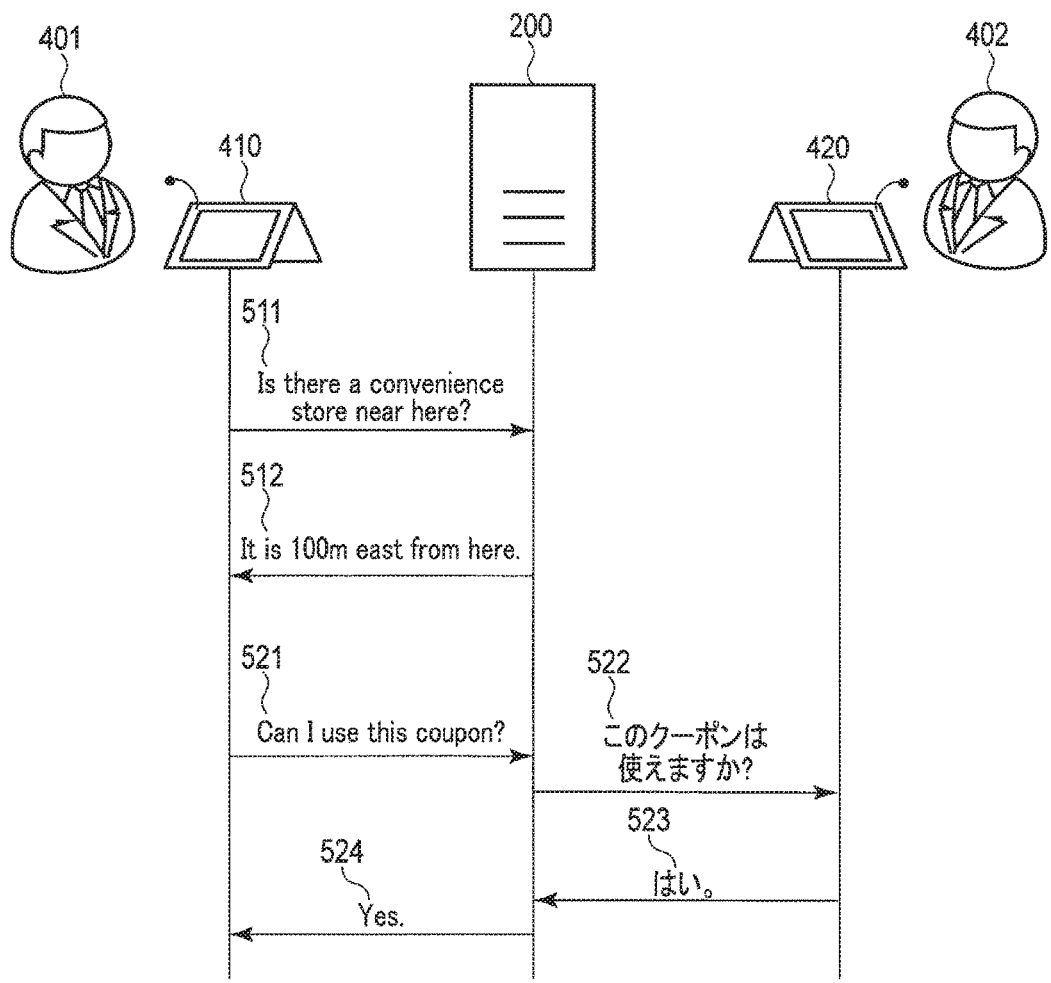
FIG. 5 is a diagram depicting an operation example of the machine translation system in FIG. 3.

FIG. 5 illustrates an operation example of the machine translation system 300. The first speaker 401 inputs a question sentence 511 in the first language "Is there a convenience store near here?" to the first client 410. The first client 410 outputs the question sentence 511 to the machine translation apparatus 200.

Upon finding a question sentence similar to the question sentence 511, the machine translation apparatus 200 outputs an answer sentence 512 "It is 100 m east from here." paired with the question sentence similar to the question sentence 511, to the first client 410. At this time, the question sentence 511 is answered without the second speaker, and thus, the first speaker 401 can quickly acquire the answer. Dialog burdens on the second speaker 402 are also reduced.

On the other hand, if no similar question sentence is found, the machine translation apparatus 200 machine-translates the question sentence in the first language into the second language, and outputs the machine translation result to the second client 420.

Specifically, the first client 410 inputs a question sentence 521 in the first language "Can I use this coupon?" to the first client 410. The first client 410 outputs the question sentence 521 to the machine translation apparatus 200.

Upon finding no question sentence similar to the question sentence 521, the machine translation apparatus 200 machine-translates the question sentence 521 in the first language into the second language, and outputs a machine translation result 522 "このクーポンは使えますか？" to the second client 420.

In response to the machine translation result 522, the second speaker 402 inputs an answer sentence 523 "はい。" to the second client 420. The second client 420 outputs the answer sentence 523 to the machine translation apparatus 200. The machine translation apparatus 200 machine-translates the answer sentence 523 in the second language into the first language, and outputs a machine translation result 524 "Yes." to the first client 410. At this time, the second speaker 402 may answer the question using the second language in spite of the question sentence in the first language, reducing the dialog burdens on the second speaker 402 resulting from the use of another language.

FIG. 6 illustrates a plurality of question sentences and a plurality of answer sentences stored in the storage 204. For example, the storage 204 stores a question sentence 601 in Japanese (second sentence) "コンビニはこの辺に ありますか？", an answer sentence 603 in Japanese "ここから東に 100 メートルです。", a question sentence 602 in English (first language) "Is there a convenience store near here?", which is English translation of the question sentence 601, and an answer sentence 604 in English "It is 100 m east from here.", which is English translation of the answer sentence 603.

The machine translation apparatus 200 performs a first operation as illustrated in FIG. 7. The first operation is performed on the questioner's input by the machine translation apparatus 200. Processing for the first operation is started in response to acquisition of an input in the first language. In the first operation described below, the storage 204 stores at least a plurality of question sentences in the first language and a plurality of answer sentences in the first language corresponding to the plurality of question sentences in the first language.

In step S701, the speech recognition unit 201 performs speech recognition on a speech signal (first speech signal) to generate a speech recognition result (first text).

In step S702, the similar-sentence retrieval unit 203 retrieves a sentence (first question sentence) similar to the speech recognition result. Specifically, the similar-sentence retrieval unit 203 retrieves the first question sentence in the first language similar to the first text, from the storage 204 and obtains the degree of similarity between the first text and the first question sentence.

In step S703, the determination unit 205 determines whether or not the degree of similarity is higher than a threshold. When the degree of similarity is higher than the threshold, the processing proceeds to step S704. When the degree of similarity is equal to or lower than the threshold, the processing proceeds to step S705.

In step S704, the similar-sentence retrieval unit 203 outputs an answer sentence (first answer sentence) corresponding to the similar sentence (first question sentence). Specifically, the determination unit 205 determines a first answer sentence in the first language corresponding to the first question sentence to be an output target to control the similar-sentence retrieval unit 203. Under the control of the determination unit 205, the similar-sentence retrieval unit 203 outputs an answer sentence (first answer sentence) corresponding to the similar sentence (first question sentence). After step S704, the processing ends.

In step S705, the machine translation unit 202 performs machine translation on the speech recognition result (first text) to generate a machine translation result (first machine translation result). Specifically, the machine translation unit 202 performs machine translation on the first text in the first language to generate a first machine translation result in the second language.

In step S706, the machine translation unit 202 outputs a speech recognition result (first machine translation result). Specifically, the determination unit 205 determines the first machine translation result to be an output target to control the machine translation unit 202. Under the control of the determination unit 205, the machine translation unit 202 outputs the speech recognition result (first machine translation result). After step S706, the processing ends.

In step S704, the similar-sentence retrieval unit 203 outputs the answer sentence to the client of the first speaker. In step S706, the machine translation unit 202 outputs the machine translation result to the client of the second speaker.

The processing in step S705 may be performed between step S701 and step S702. In this case, in step S706, the determination unit 205 controls the output from the machine translation unit 202.

Figure 8:
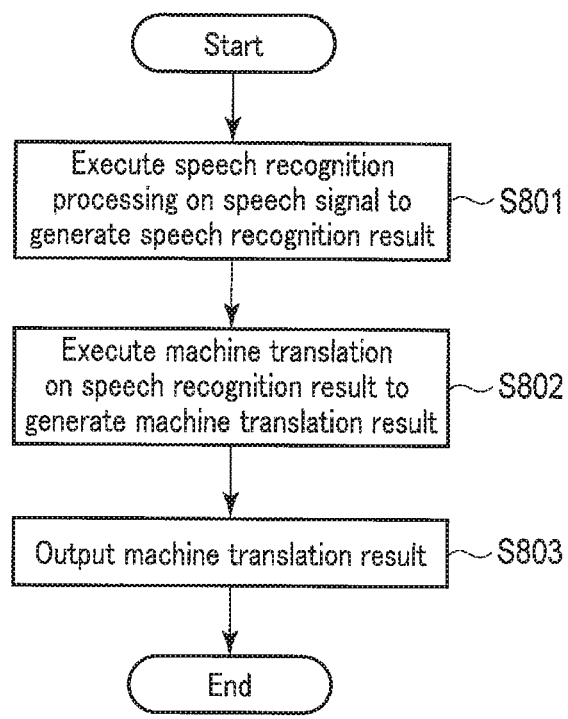
FIG. 8 is a flowchart illustrating a second operation of the machine translation apparatus in FIG. 2.

The machine translation apparatus 200 performs a second operation as illustrated in FIG. 8. The second operation is performed on the questionee's input by the machine translation apparatus 200. Processing for the second operation acted in response acquisition of an input in the second language.

In step S801, the speech recognition unit 201 performs speech recognition processing on a speech signal (second speech signal) to generate a speech recognition result (second text).

In step S802, the machine translation unit 202 performs machine translation on the speech recognition result (second text) to generate a machine translation result (second machine translation result). Specifically, the machine translation unit 202 performs machine translation on the second text in the second language to generate a second machine translation result in the first language.

In step S803, the machine translation unit 202 outputs a machine translation result (second machine translation result). After step S803, the processing ends.

In step S803, the machine translation result is output to the client of the first speaker.

As described above, the machine translation apparatus according to the first embodiment performs machine translation on the first text in the first language to generate the first machine translation result in the second language, which is different from the first language. The machine translation apparatus retrieves the first question sentence in the first language similar to the first text to obtain the degree of similarity between the first text and the first question sentence. The machine translation apparatus further determines whether or not the degree of similarity is higher than the threshold. When the degree of similarity is higher than the threshold, the machine translation apparatus determines the first answer sentence in the first language corresponding to the first question sentence to be an output target. When the degree of similarity is equal to or lower than the threshold, the machine translation apparatus determines the first machine translation result to be an output target. Therefore, the machine translation apparatus allows frequently asked questions to be automatically answered, enabling a reduction in dialog burdens.

Second Embodiment

The storage of the machine translation apparatus according to the first embodiment stores at least question sentences and answer sentences in the first language. On the other hand, a storage of a machine translation apparatus according to the second embodiment stores question sentences and answer sentences in the second language. Even when only data in the second language is stored in the storage of the machine translation apparatus according to the second embodiment, the machine translation apparatus can accept and process an input in the first language. Operations of the units of the machine translation apparatus are similar to the corresponding operations in the first embodiment and will not be described below. For convenience, the following description uses reference numerals in FIG. 2.

Figure 9:
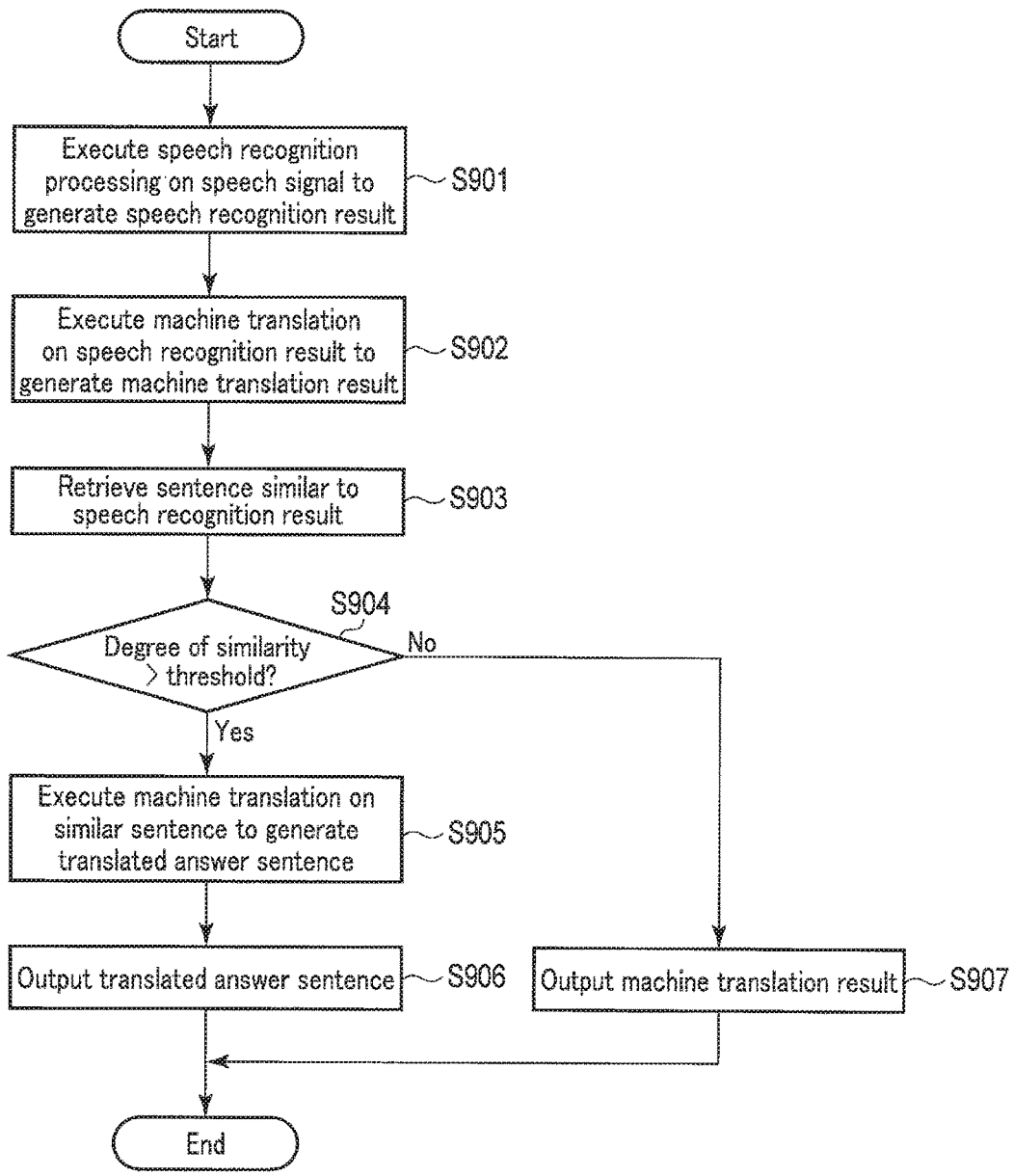
FIG. 9 is flowchart illustrating a first operation of a machine translation apparatus according to a second embodiment.

The machine translation apparatus according to the second embodiment performs a first operation as illustrated in FIG. 9. Processing for the first operation is started in response to acquisition of an input in the first language. In the first operation described below, the storage 204 stores at least a plurality of question sentences in the second language and a plurality of answer sentences in the second language corresponding to the plurality of question sentences in the second language.

In step S901, the speech recognition unit 201 performs speech recognition on a speech signal (first speech signal) to generate a speech recognition result (first text).

In step S902, the machine translation unit 202 performs machine translation on the speech recognition result (first text) to generate a machine translation result (first machine translation result). Specifically, the machine translation unit 202 performs machine translation on the first text in the first language to generate a first machine translation result in the second language.

In step S903, the similar-sentence retrieval unit 203 retrieves a sentence (first question sentence) similar to the machine translation result. Specifically, the similar-sentence retrieval unit 203 retrieves the first question sentence in the second language similar to the first machine translation result and obtains the degree of similarity between the first machine translation result and the first question sentence.

In step S904, the determination unit 205 determines whether or not the degree of similarity is higher than a threshold. When the degree of similarity is higher than the threshold, the processing proceeds to step S905. When the degree of similarity is equal to or lower than the threshold, the processing proceeds to step S907.

In step S905, the machine translation unit 202 performs machine translation on the answer sentence (first answer sentence) corresponding to the similar sentence (first question sentence) to generate a translated answer sentence (translated sentence). Specifically, the machine translation unit 202 performs machine translation on the first answer sentence to generate a translated answer sentence (translated sentence) in the first language.

In step S906, the machine translation unit 202 outputs the translated answer sentence (translated sentence). Specifically, the determination unit 205 determines the translated answer sentence (translated sentence) for the first answer sentence in the second language to be an output target to control the machine translation unit 202. Under the control of the determination unit 205, the machine translation unit 202 outputs the translated answer sentence (translated sentence). After step S906, the processing ends.

In step S907, the machine translation unit 202 outputs the machine translation result (first machine translation result). Specifically, the determination unit 205 determines the first machine translation result to be an output target to control the machine translation unit 202. Under the control of the determination unit 205, the machine translation unit 202 outputs the machine translation result (first machine translation result). After step S907, the processing ends.

In step S906, the machine translation unit 202 outputs the translated answer sentence to the client of the first speaker. In step S907, the machine translation unit 202 outputs the machine translation result to the client of the second speaker.

As described above, even when only data in the second language is stored in the storage of the machine translation apparatus according to the second embodiment, the machine translation apparatus can accept and process an input in the first language. Therefore, the machine translation apparatus can produce effects similar to the effects of the machine translation apparatus according to the first embodiment.

Third Embodiment

Figure 10:
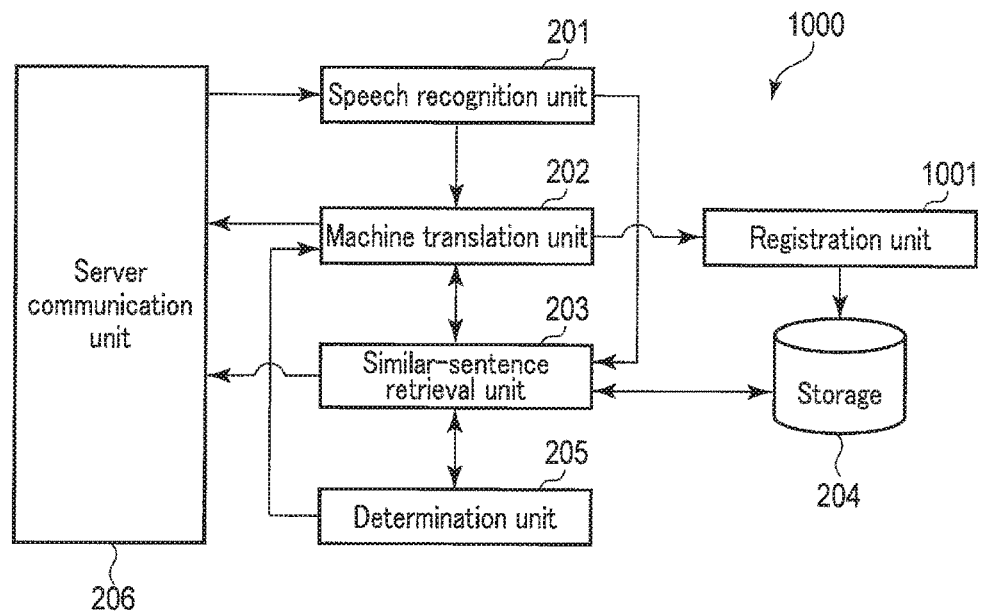
FIG. 10 is a block diagram illustrating a machine translation apparatus according to a third embodiment.

As illustrated in FIG. 10, a machine translation apparatus 1000 according to a third embodiment comprises a speech recognition unit 201, a machine translation unit 202, a similar-sentence retrieval unit 203, a storage 204, a determination unit 205, a server communication unit 206, and a registration unit 1001. That is, the machine translation apparatus 1000 corresponds to the machine translation apparatus according to the first embodiment or the second embodiment but with the addition of the registration unit 1001. The machine translation apparatus 1000 may translate a pair of a question sentence and an answer sentence acquired in the second language into the first language and register the resultant sentence in the storage 204. Differences from the units in the first and second embodiments and the registration unit 1001 will be described below.

The speech recognition unit 201 performs speech recognition on a speech signal to generate a speech recognition result in a text format (a question sentence and an answer sentence in the second language).

The machine translation unit 202 performs machine translation on the speech recognition result to generate a machine translation result (a question sentence and an answer sentence in the first language). The machine translation unit 202 outputs the machine translation result to the registration unit 1001. When the speech recognition result in the first language is received from the speech recognition unit 201, the machine translation processing in the machine translation unit 202 is omitted.

The registration unit 1001 receives the machine translation result from the machine translation unit 202. The registration unit 1001 registers the speech recognition result and the machine translation result in the storage 204 in association with each other. The registration unit 1001 may register one of the speech recognition result and the machine translation result in the storage 204.

Figure 11:
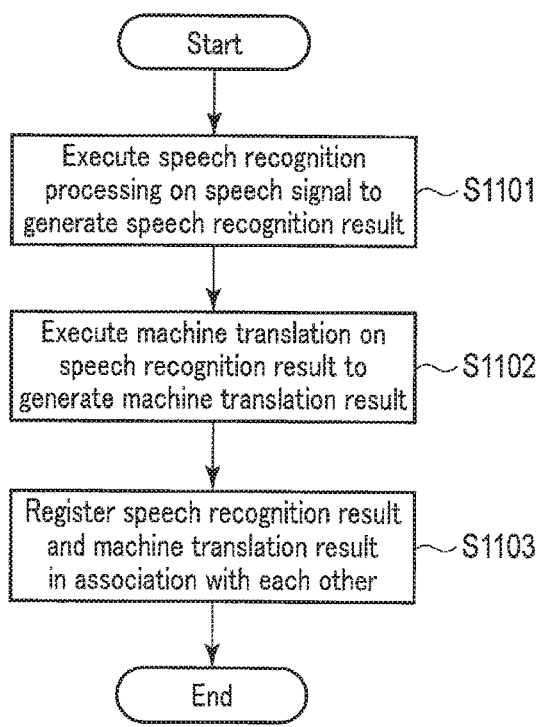
FIG. 11 is a flowchart illustrating a third operation of the machine translation apparatus in FIG. 10.

The machine translation apparatus 1000 performs a third operation as illustrated in FIG. 11. The third operation registers answer sentences and question sentences in the storage 204. Processing for the third operation is started in response to acquisition of an input in the second language. In the third operation described below, the registration unit 1001 registers a question sentence and an answer sentence in the first language and a question sentence and an answer sentence in the second language in the storage 204 such that the question sentence and the answer sentence in the first language are associated with the question sentence and the answer sentence in the second language. Alternatively, the registration unit 1001 may register either the question sentence and the answer sentence in the first language or the question sentence and the answer sentence in the second language in the storage 204.

In step S1101, the speech recognition unit 201 performs speech recognition on a speech signal (second speech signal) to generate a speech recognition result (second text) in a text format. The second text includes the question sentence and the answer sentence in the second language.

In step S1102, the machine translation unit 202 performs machine translation on the speech recognition result (second text) to generate a machine translation result (second machine translation result). Specifically, the machine translation unit 202 performs machine translation on the second text in the second language to generate a second machine translation result in the first language.

In step S1103, the registration unit 1001 registers the speech recognition result and the machine translation result in association with each other. Specifically, when the second text includes a question sentence and an answer sentence, the registration unit 1001 registers the second text and the second machine translation result in the storage 204 in association with each other. After step S1103, the processing ends.

In the above-described processing, the registration unit 1001 registers question sentences and answer sentences in the storage 204 as illustrated in FIG. 6.

As described above, the machine translation apparatus according to the third embodiment allows a pair of a question sentence and an answer sentence input in the second language to be translated into the first language and then allows the resultant sentence to be registered in the storage. In other words, the machine translation apparatus can register question sentences and answer sentences in the first language in the storage using the second language utilized by the questionee (operator). Therefore, the machine translation apparatus enables a reduction in operational burdens on the operator and in costs for translation and the like.

Fourth Embodiment

Question sentences and answer sentences are stored in the storages of the machine translation apparatuses according to the first embodiment, the second embodiment, and the third embodiment. On the other hand, location information is further stored in a storage of a machine translation apparatus according to a fourth embodiment. Differences from the units in the first to third embodiments will be described below. The location information is indicative of, for example, the location of a destination client and is, for example, automatically imparted to input data. The location information may be determined based on the client having input the data or by pre-designating the designation. For an input from a certain client, the machine translation apparatus according to the fourth embodiment references the location information stored in the storage 204 and the client having input the data and performs relevant processing with reference to a question sentence and an answer sentence for which the location information and the client match. For convenience, the following description uses the reference numerals in FIG. 10.

The storage 204 further stores location information indicative of a destination corresponding to a question sentence and an answer sentence.

Upon newly registering the question sentence, the answer sentence, and the location information in the storage 204 in association with one another, the registration unit 1001 determines whether any similar question sentence is present which is associated with another piece of location information different from the registered location information. When no similar question sentence is present which is associated with the other piece of location information different from the registered location information, the registration unit 1001 further stores the other piece of location information in the storage 204 in association with the newly registered question sentence and answer sentence.

FIG. 12 illustrates question sentences, answer sentences and location information stored in the storage 204. The storage 204 stores a pair of a question sentence 1201 in Japanese (second language) "トイレはどこですか？" and an answer sentence 1203 in Japanese "あの角を曲がったあたりにあります。", a pair of a question sentence 1202 in English (first language) "Where is a restroom?" and an answer sentence 1204 in English "It is around the corner.", and location information 1205 "Counter 1" in association with one another. The location information stored in the storage 204 may be an identifier for each client as illustrated in FIG. 12 or location information based on a global positioning system (GPS) or the like and including latitude and longitude.

Figure 13:
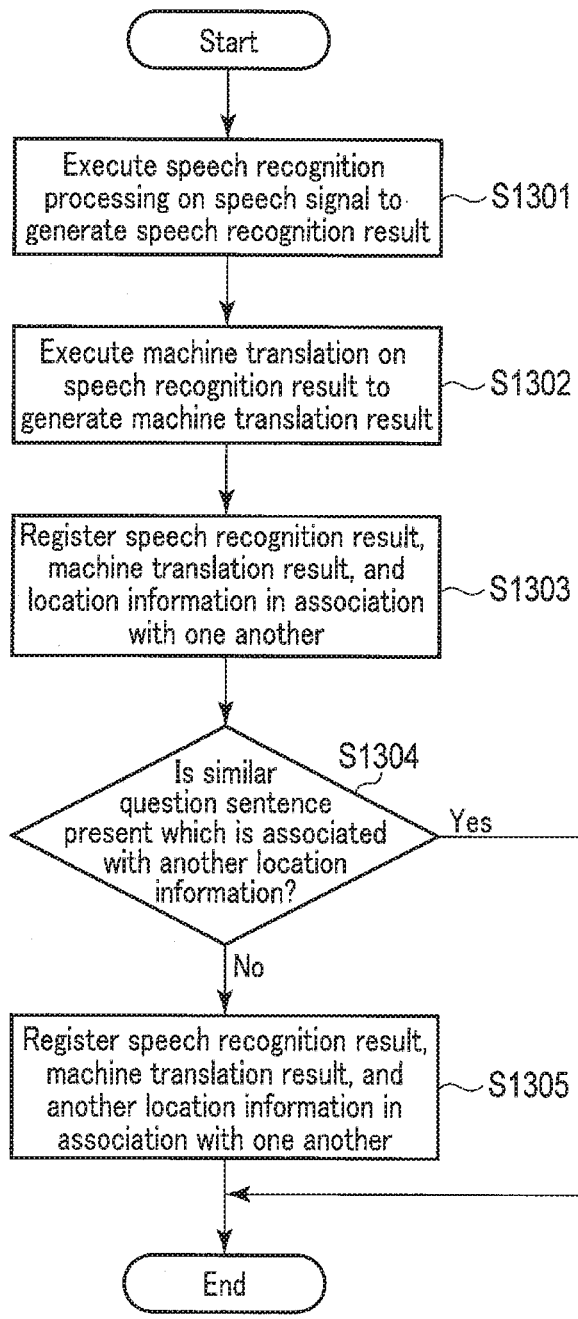
FIG. 13 is a flowchart illustrating a fourth operation of the machine translation apparatus according to the fourth embodiment.

The machine translation apparatus according to the fourth embodiment performs a fourth operation as illustrated in FIG. 13. The fourth operation registers an answer sentence, a question sentence, and location information in the storage 204. Processing for the fourth operation is started in response to acquisition of an input in the second language. In the following fourth operation, the registration unit 1001 registers a question sentence and an answer sentence in the first language and a question sentence and an answer sentence in the second language in the storage 204 such that the question sentence and the answer sentence in the first language are associated with the question sentence and the answer sentence in the second language. Alternatively, the registration unit 1001 may register either the question sentence and the answer sentence in the first language or the question sentence and the answer sentence in the second language in the storage 204.

In step S1301, the speech recognition unit 201 performs speech recognition processing on a speech signal (second speech signal) to generate a speech recognition result (second text) in a text format. The second text includes the question sentence and the answer sentence in the second language. The location information may be provided at the time of data input.

In step S1302, the machine translation unit 202 performs machine translation on the speech recognition result (second text) to generate a machine translation result (second machine translation result). Specifically, the machine translation unit 202 performs machine translation on the second text in the second language to generate a second machine translation result in the first language.

In step S1303, the registration unit 1001 registers the speech recognition result, the machine translation result, and the location information in association with one another.

In step S1304, the registration unit 1001 determines whether any similar question sentence is present which is associated with another piece of location information different from the registered location information. When a similar question sentence is present which is associated with the other piece of location information different from the registered location information, the processing ends. When no similar question sentence is present which is associated with the other piece of location information different from the registered location information, the processing proceeds to step S1305.

In step S1305, the registration unit 1001 registers the other piece of location information in association with the speech recognition result and machine translation result registered in step S1303. After step S1305, the processing ends.

Using FIG. 14, processing by the registration unit 1001 in step S1305 in FIG. 13 will be described. The registration unit 1001 determines whether a similar question sentence 1201 "トイレはどこで すか？" associated with location information 1405 "Counter 2" different from the location information 1205 "Counter 1" exists. No similar question sentence is present, and thus, the registration unit 1001 registers, in association with the location information 1405, a question sentence 1401 "(TEMP) トイレは どこですか？", a question sentence 1402 "(TEMP) Where is a restroom?", an answer sentence 1403 "(TEMP) あの角を曲がっ た あ たりにあります。", and an answer sentence 1404 "(TEMP) It is around that corner." which result from copying of the question sentence 1201, the question sentence 1202, the answer sentence 1203, and the answer sentence 1204. "(TEMP)" indicates that whether or not the sentence is applicable for the location information 1405 has not been determined.

As described above, the machine translation apparatus according to the fourth embodiment further stores the location information in the storage. Therefore, for one question sentence, the machine translation apparatus can output different answer sentences to respective clients at different locations. The machine translation apparatus with the registration unit can register a question sentence and an answer sentence registered in association with a certain location, in association with another location. Therefore, even if similar questions are acquired from different clients, this can be dealt with by quickly reflecting relevant data on the input.

Instructions indicated in the process procedure illustrated in the above-described embodiments can be executed based on a program that is software. A general-purpose computer system pre-stores and loads the program to enable production of effects similar to the effects of the machine translation apparatuses in the above-described embodiments.

The instructions described in the above-described embodiments are recorded in a magnetic disk (a flexible disk, a hard disk, or the like), an optical disc (CD-ROM, CD-R, CD-RW, DVD-ROM, DVD±R, DVD±RW, or the like), a semiconductor memory, or a similar recording medium as a program which can be executed by a computer. The recording medium may use any storage format so long as a computer and an embedded system can read data from the recording medium. By loading the program from the recording medium and allowing a CPU to execute instructions described in the program based on the program, the computer can achieve operations similar to the operations of the machine translation apparatuses in the above-described embodiments. Of course, when acquiring or loading the program, the computer may perform the acquisition or loading through a network.

A part of the processing for implementing the present embodiments may be executed by an OS (Operating System) running on the computer based on the instructions in the program installed in the computer or the embedded system via the recording medium, or by MW (middleware) such as database management software or a network.

The recording medium in the present embodiments is not limited to a medium independent of the computer or the embedded system but may be a recording medium which stores or temporarily stores the downloaded program transmitted via a LAN or the Internet.

The recording medium in the present embodiments is not limited to a single recording medium but may embrace a case where, the processing in the present embodiments is executed through a plurality of media.

The computer in the present embodiments is not limited to a personal computer but may be an arithmetic processing apparatus included in information processing equipment, a multifunction mobile phone, a microcomputer, or the like. The computer in the present embodiments is a general term for equipment and apparatuses which enable the functions in the present embodiments to be implemented through the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A machine translation apparatus comprising:
a memory configured to store question sentences in a first language, answer sentences in the first language, and location information items indicative of a location of a destination in association with one another; and
processing circuitry electrically coupled to the memory, the processing circuitry being configured to:
perform machine translation on a first text in the first language to generate a first machine translation result in a second language;
retrieve a first question sentence in the first language similar to the first text from the memory to obtain a degree of similarity between the first text and the first question sentence;
determine a first answer sentence in the first language corresponding to the first question sentence to be an output target when the degree of similarity is higher than a threshold and determine the first machine translation result to be an output target when the degree of similarity is equal to or lower than the threshold; and
determine, when newly registering a question sentence, an answer sentence, and a location information item in the memory in association with one another, whether or not a question sentence is present which is similar to the new question sentence and which is associated with another location information item different from the new location information item, and register the new question sentence, the new answer sentence, and the other location information item in the memory in association with one another when no question sentence is present which is similar to the new question sentence and which is associated with the other location information item different from the new location information item.

2. The machine translation apparatus according to claim 1, wherein the processing circuitry is further configured to register the question sentences, the answer sentences, and the location information items in the memory.

3. The machine translation apparatus according to claim 2, wherein the processing circuitry is further configured to register the first machine translation result in the memory when the first text includes a question sentence and an answer sentence.

4. The machine translation apparatus according to claim 1, wherein the processing circuitry is further configured to perform speech recognition on a first speech signal to generate the first text.

5. The machine translation apparatus according to claim 4, wherein the processing circuitry is further configured to:
perform speech recognition on a second speech signal in the second language different from the first speech signal to generate a second text in the second language; and
perform machine translation on the second text in the second language to generate a second machine translation result in the first language.

6. The machine translation apparatus according to claim 1, wherein the processing circuitry is further configured to:
perform machine translation on a second text in the second language different from the first text to generate a second machine translation result in the first language; and
register the second machine translation result in the memory when the second text includes a question sentence and an answer sentence.

7. A machine translation apparatus comprising:
a memory configured to store question sentences in a second language, answer sentences in the second language, and location information items indicative of a location of a destination in association with one another; and
processing circuitry electrically coupled to the memory, the processing circuitry being configured to:
perform machine translation on a first text in a first language to generate a first machine translation result in the second language;
retrieve a first question sentence in the second language similar to the first machine translation result from the memory to obtain a degree of similarity between the first machine translation result and the first question sentence;
determine a translated sentence in the first language for a first answer sentence in the second language corresponding to the first question sentence to be an output target when the degree of similarity is higher than a threshold and determine the first machine translation result to be an output target when the degree of similarity is equal to or lower than the threshold; and
determine, when newly registering a question sentence, an answer sentence, and a location information item in the memory in association with one another, whether or not a question sentence is present which is similar to the new question sentence and which is associated with another location information item different from the new location information item, and register the new question sentence, the new answer sentence, and the other location information item in the memory in association with one another when no question sentence is present which is similar to the new question sentence and which is associated with the other location information item different from the new location information item.

8. The machine translation apparatus according to claim 7, wherein the processing circuitry is further configured to perform machine translation on the first answer sentence in the second language to generate the translated sentence in the first language.

9. The machine translation apparatus according to claim 7, wherein the processing circuitry is further configured to register the question sentences, the answer sentences, and the location information items in the memory.

10. The machine translation apparatus according to claim 9, wherein the processing circuitry is further configured to register the first machine translation result in the storage when the first text includes a question sentence and an answer sentence.

11. The machine translation apparatus according to claim 7, wherein the processing circuitry is further configured to perform speech recognition on a first speech signal to generate the first text.

12. The machine translation apparatus according to claim 11, wherein the processing circuitry is further configured to:
perform speech recognition on a second speech signal in the second language different from the first speech signal to generate a second text in the second language; and
perform machine translation on the second text in the second language to generate a second machine translation result in the first language.

* * * * *